United States Patent
van der Meulen et al.

[19]

[11] Patent Number: 6,128,021
[45] Date of Patent: Oct. 3, 2000

[54] DOWNLOADING IMAGE GRAPHICS WITH ACCELERATED TEXT CHARACTER AND LINE ART CREATION

[75] Inventors: Pieter Sierd van der Meulen, Sunnyvale; Gregory Robert Roelofs, San Jose, both of Calif.

[73] Assignee: Philips Electronics North America Corporation, New York, N.Y.

[21] Appl. No.: 08/722,415

[22] Filed: Oct. 1, 1996

[51] Int. Cl.$^7$ .................................................. G06T 15/00
[52] U.S. Cl. ................................................................ 345/428
[58] Field of Search ................................. 345/428, 429, 345/430, 422, 418, 419, 420

[56] References Cited

U.S. PATENT DOCUMENTS

| | | | |
|---|---|---|---|
| 4,924,521 | 5/1990 | Dinan et al. | 382/54 |
| 5,311,329 | 5/1994 | Haeberli et al. | 358/448 |
| 5,784,064 | 7/1998 | Penna et al. | 345/422 |

FOREIGN PATENT DOCUMENTS

| | | |
|---|---|---|
| 2295936 | 6/1996 | United Kingdom . |
| 91/14334 | 9/1991 | WIPO . |

*Primary Examiner*—Phu K. Nguyen
*Assistant Examiner*—Cliff N. Vo
*Attorney, Agent, or Firm*—Peter Verdonk

[57] ABSTRACT

An image is transferred from a sender to a receiver. The image is progressively re-created at a display of the receiver. First, a low-resolution full-color representation of the image is transferred. Then, a full-resolution limited-color representation of the image is sent. The pixel values of the full-resolution representation typically represent alpha-numerical characters or edges of features. The representations are combined to create a version of the image by modifying the pixels of first representation under control of the limited-color content of the spatially corresponding pixel of the second representation. The legibility of the combined image is achieved considerably faster than with conventional techniques.

13 Claims, 6 Drawing Sheets

DOWNLOADING IMAGE GRAPHICS WITH ACCELERATED TEXT CHARACTER AND LINE ART CREATION

FIELD OF THE INVENTION

The invention relates to a method and a system for enabling to create a graphics image.

BACKGROUND ART

Downloading of graphics, e.g., via the Internet/WWW or any other network, is a slow process if, for example, the bandwidth is limited or the server is overloaded.

For example, a 100 KByte GIF (Graphics Interchange Format) file requires 30 seconds or more to download with 28.8K modem. GIF image data is always stored by scanline and by pixel. Also, GIF can store only images with a maximum pixel depth of 8 bits, for a maximum of 256 colors. Using a GIF with a scheme of interlacing scanlines permits viewers to see enough of a clickable image map to navigate it in about half the time, i.e., 15 seconds in the example above.

PNG (Portable Network Graphics) is another lossless image format, capable of processing more than 256 colors and having somewhat better compression performance than GIF. Navigation is possible in a time period even shorter than for the interlaced GIF, owing to the two-dimensional interlacing method used in the PNG format.

Progressive JPEG is an excellent lossy compression method for, e.g., natural scenes (typically a pixel depth of 6 to 24 bits). The JPEG images are typically of smaller size than comparable GIF or PNG images. However, JPEG is not really suited to process animations, ray tracing, line art, black-and-white documents, and typical vector graphics.

OBJECT OF THE INVENTION

Graphics images, including natural scenes, line art and superimposed text characters, are typically used for navigation through Internet/WWW pages. Downloading graphics over low-speed connections, congested networks and overloaded servers adversely affect the time necessary to create a legible image at the user end of the image processing system. Before selecting a part in the image being created, the viewer has to wait until the image is readable. The inventors have realized that the poor legibility of the image may last inconveniently long when using conventional techniques, even when techniques are used that include interlacing or other known progressive display methods.

SUMMARY OF THE INVENTION

The invention addresses the problem of the delayed legibility during creation of an image in conventional systems. In order to solve this problem, the invention provides the following method of enabling to create an image. The invention involves supplying first and second representations of the image. The first representation has a spatially low resolution and comprises first pixels, each with a first pixel value of a first pixel depth. The second representation has a spatially high resolution and comprises second pixels, each with a second pixel value of a second pixel depth. The second pixel depth is substantially smaller than the first pixel depth. The first and second representations are combined by assigning a further pixel value to a specific first pixel, spatially corresponding with the specific second pixel, under control of a specific second pixel value of the specific second pixel.

For example, the assigning is executed if the specific second pixel value meets a pre-specified threshold criterion. If the specific second pixel value does not comply with the criterion, the value of the specific first pixel is not modified. The assigning comprises, e.g., selecting the further pixel value from a gray-value range, or creating the further pixel value with an intensity determined by the second pixel value and with a color content determined by the first pixel value. The representations thus combined may, as an option, be overwritten by a third representation of the image, the third representation having a spatially high resolution and having pixels with third pixel values of a third pixel depth that is greater than the second pixel depth. For example, the third pixel depth is equal to or greater than the first pixel depth.

The inventors have found that this method achieves readability of the combined image on the screen in a time that is typically an order of magnitude shorter than would be the case if the full-resolution, full-color image were downloaded. The low resolution representation is typically a mood-setting or background color picture and is transmitted in a reduced format. Its format at the receiving end is then restored using known techniques. The high resolution representation typically represents the whole body and/or the borders of a text character, e.g., an alpha-numerical character, or of a typographical character, such as an arrow, a box or a push-button image. Both kinds of characters are of primary importance to the user in determining the image's information content, for example, for navigating through Internet/WWW pages. The invention renders this primary information available in the combination of the first and second representations before the eventual high-resolution full color image is downloaded. Advantages are the following. First of all, the user need not wait as long as in the known systems before legible information has actually appeared. Accordingly, the invention is an improvement in user-friendliness over the prior art. Secondly, when graphics images are used for navigation through the network, the user can stop further downloading once an image allows for selecting a next image. This usually is the case when legibility is merely sufficient, well before the entire full-resolution image has been re-created at the receiver. The invention thus enables the reduction of network congestion and server overload.

The invention applies to, e.g., client-server networks wherein the server downloads the image representations, as well as stand-alone apparatus, such as a CD-I device integrated with a consumer home theater, wherein the CD-I apparatus supplies the representations under user-control.

BRIEF DESCRIPTION OF THE DRAWINGS

The invention is explained, by way of example, in further detail below with reference to the accompanying drawings, wherein.

DETAILED EMBODIMENTS

Flow diagram

Figure 1:
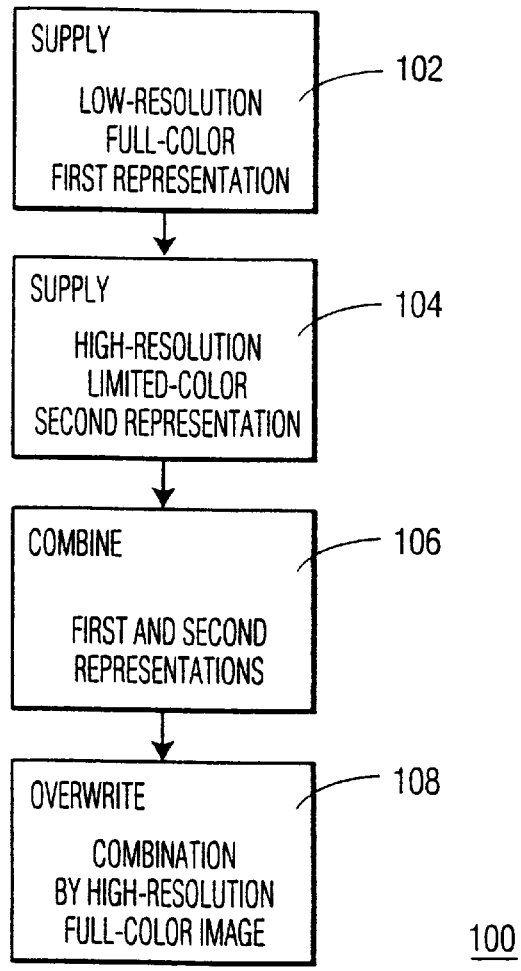
FIG. 1 is a flow diagram illustrating the steps in a method of the invention.

FIG. 1 is a flow diagram 100 illustrating the method in the invention for creating an image at a receiver. In step 102, a first image representation is supplied with a spatially low resolution and with first pixels that each have a first pixel value of a first pixel depth. The first image is (optionally) rendered as it arrives. The pixel depth indicates the number of different first pixel values that a particular first pixel can assume. In step 104, a second image representation is supplied with a spatially high resolution and with second pixels, each with a second pixel value of a second pixel depth substantially smaller than the first pixel depth. In step 106, the first and second representations are combined on a display or at another storage device. Step 106 may be performed subsequently to, or concurrently with, step 104. The combining involves assigning a further pixel value to a specific first pixel, spatially corresponding with the specific second pixel, under control of a specific second pixel value of the specific second pixel. Control by the specific second pixel value may be implemented by a threshold criterion: for example, the first pixel value is modified only when the specific second pixel value is larger than a threshold. In a particular embodiment of the method, the second pixel value of the corresponding second pixel determines the selection the further pixel value from a gray-value range. The result of this combination is then a full-color background with spatially low resolution and an overlay with a spatially high resolution of selective gray values, typically black and/or white. In an alternative embodiment, the further pixel value is created using an intensity that determined by the second pixel value and using a color content determined by the first pixel value. In step 108 the combination of the first and second representations is overwritten by a third representation of the image, the third representation having a spatially high resolution and having pixels with third pixel values of at least the first pixel depth. The overwriting may be executed by, e.g., an interlacing method.

Note that the overwriting is optional. In a navigation application, wherein the user goes interactively from one image to another image on a display, it may not be necessary to complete or even perform downloading the high-resolution, full-color image at all when the user has already made a next selection based on the information available from the combination, i.e., prior to overwriting the compound image by the full-resolution representation. In a content-creation application, there may not be a full-color, high-resolution final image, since the result is created in only two passes using the above scheme.

The term "color" in this text is meant to cover both cases of a range of different colors and of a range of gray levels.

The invention is not limited to a two-pass creation process only with a full color-depth, low-resolution first representation and a low color-depth, high-resolution second representation. The number of passes may be extended, for example, by specifying a third (and a fourth, . . ., etc.) representation of intermediate resolution and intermediate color-depth to provide a further layer of information for the eventual compound image.

Graphical Explanation of Combining Step

Figure 2:
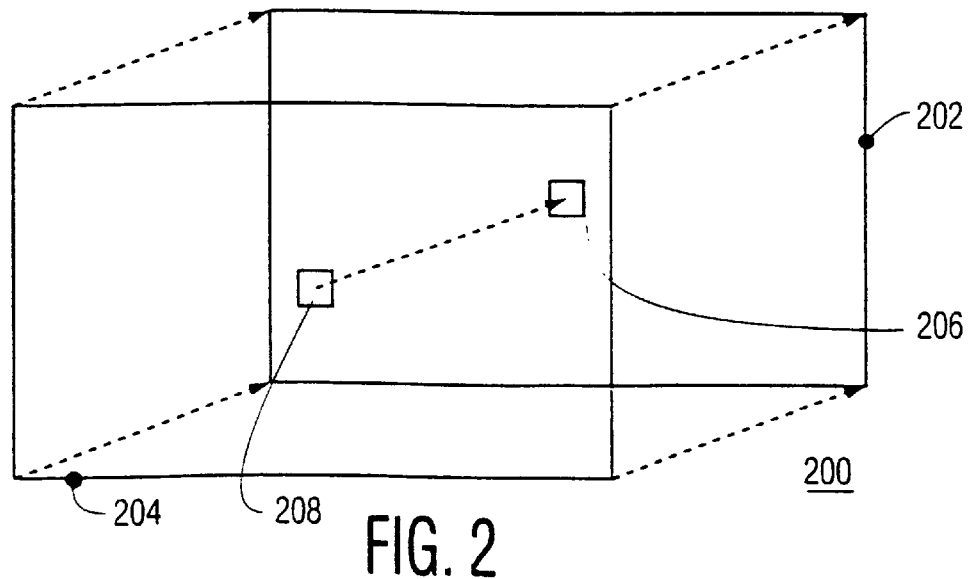
FIG. 2 is a diagram explaining the combination step.

FIG. 2 is a diagram 200 to explain the combination step 106 in FIG. 1. In diagram 200, a plane area 202 symbolizes a first pixel array of the first image representation with spatially low resolution and with a high pixel depth. A plane area 204 symbolizes a second pixel array of the second image representation with spatially high resolution but with low pixel depth. The location relative to the array of a specific first pixel 206 in area 202 corresponds with the location of a specific second pixel 208 in area 204. The pixel value of specific first pixel 206 is modified according to some pre-specified rule if the pixel value of specific second pixel 208 meets some pre-determined criterion as explained above.

Example of Progressive Image Creation at Receiver

FIGS. 3, 4, 5 and 6 show the stages of the progressive re-creation of an image 300 in accordance with the invention.

Figure 3:
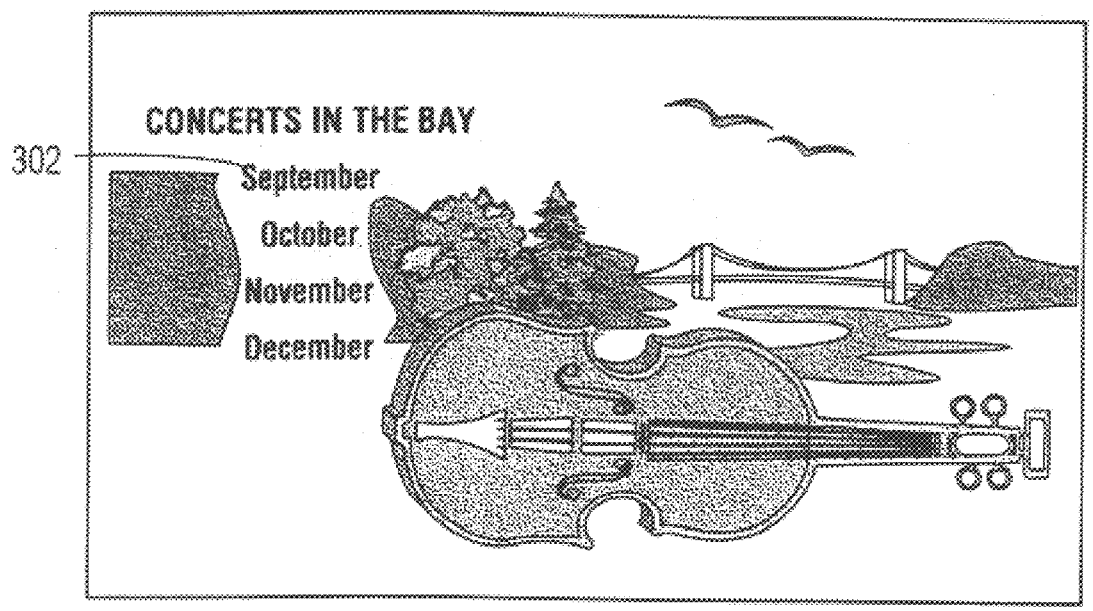
FIGS. 3–6 give an example of the progressive creation of an image at the receiving end according to the invention.

FIG. 3 gives an example of an original image 300 to be transferred from a sender to a receiver, e.g., from a server via the Internet to a PC or a sophisticated TV receiver. Image 300 is one image of a certain web page with a selection menu for musical activities in and around San Francisco during the months September, October, November and December. The user may wish to see what has been scheduled for September by clicking the word "September" indicated by reference numeral 302. Image 300 is re-created at the receiving end in steps, as indicated in the diagram 100 of FIG. 1.

Figure 4:
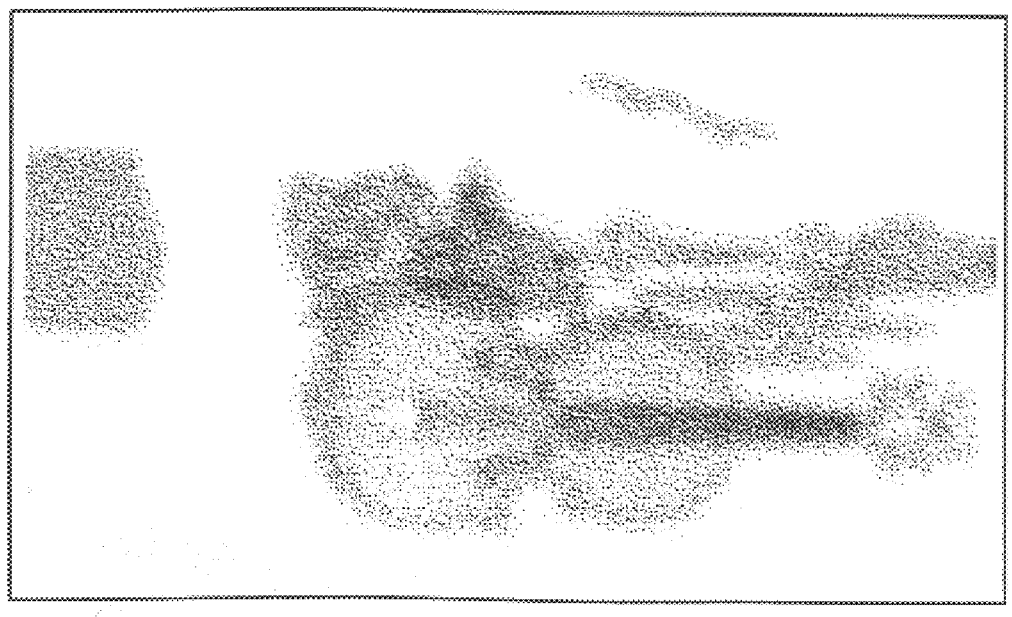

Referring to FIG. 4, a low-resolution representation 400 of image 300 is transmitted first. Low-resolution representation 400 is created, for example, as follows. Original image 300 is divided in a number of squares, each square containing a number of pixels, e.g., 16×16 pixels. Then, a single color or gray-scale value is calculated to represent a respective square using a known averaging technique. The result is a full-color or full-gray-scale, but low-resolution representative 400 of original image 300. Low-resolution representation 400 is a mapping from image 300 to a reduced size format. Preferably, it is this reduced format that is transmitted to the receiver, requiring low bandwidth. At the receiving end, its size is then restored, a smoothing and dithering technique is applied to improve the appearance, and a full-size low-resolution full-color or full-gray-scale representation 400 is displayed.

Figure 5:
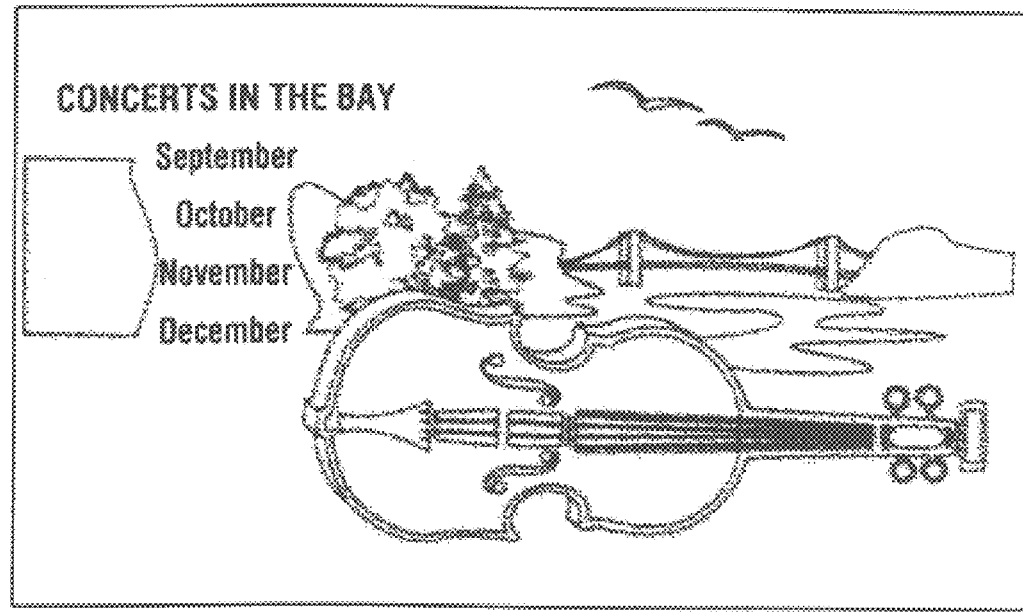
Figure 6:
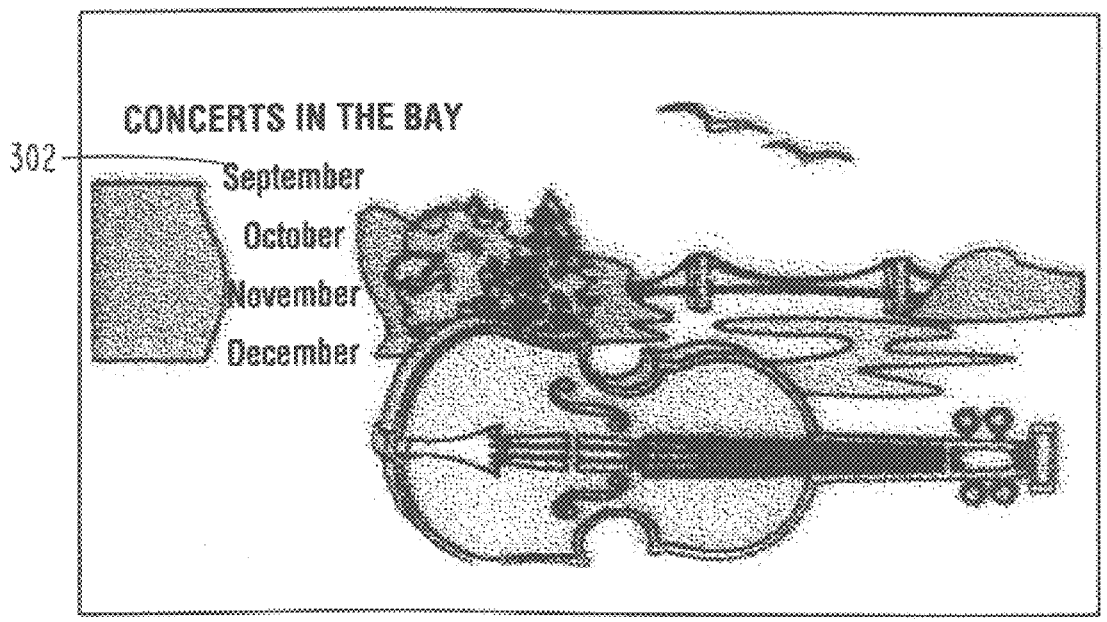

Referring to FIG. 5, an overlay 500 is created next. Overlay 500 contains a spatially full-resolution representation of image 300 wherein the pixels are assigned pixel values of low depth. Overlay 500 is created, for example, as follows.

First, an original intensity of each particular original pixel of original image 300 is determined. Then, a particular second pixel value of a particular one of the second pixels, spatially corresponding to a particular original pixel of overlay 500, is determined as a function of the original intensity. This could be achieved in a variety of manners. For example, the original intensity is compared to one or more predetermined thresholds in order to determine the appropriate intensity range. Then, different second pixel values are assigned to second pixels that are associated with different intensity ranges.

Alternatively, a first intensity of each particular first pixel in the first representation is determined. Then, the first intensity of the particular first pixel is subtracted from the original intensity of the particular original pixel, spatially corresponding to the particular first pixel. Since this subtraction may extend the intensity range by a factor 2, the result of the subtracting is preferably re-normalized (e.g., an upward shift followed by a division by 2) to fall within the original range. The re-normalized result is then used to determine the particular second pixel value, e.g., through appropriate thresholding. This renormalization technique is commonly referred to as "edge detection", "localized average subtraction", "high-pass filtering", or "unsharp masking" (in astronomy).

Note that the second pixel values are used as control information to merge the high-resolution information of the second representation with the low-resolution background of the first representation: a further pixel value is assigned to a specific first pixel, spatially corresponding with a specific second pixel, under control of the specific second pixel value.

As an example, overlay 500 may consist of pixels indicating a low intensity in image 300, all other pixels then being made transparent in overlay 500. The low-intensity pixels in image 300 are given a uniform value (black, white or a uniform color) in overlay 500, regardless of the 5 original color of the pixel in the original image 300. Alternatively, high-intensity pixels in image 300 may instead be mapped to pixels of uniform value in the overlay. Intensities in the original image 300 are truncated in this manner. Overlay 500 then can be encoded in an entropy-coding technique, e.g., a run-length code, for economic transmission. Full-resolution, truncated, overlay 500 is then combined with low-resolution representation 400, using a conventional overlay technique, to create an image 600 shown in FIG. 6. In image 600, the text characters and some other pronounced regions are clearly visible to such an extent that navigation is possible. This combination may eventually, as an option, be overwritten by original high-resolution and full-color image 300.

Figure 7:
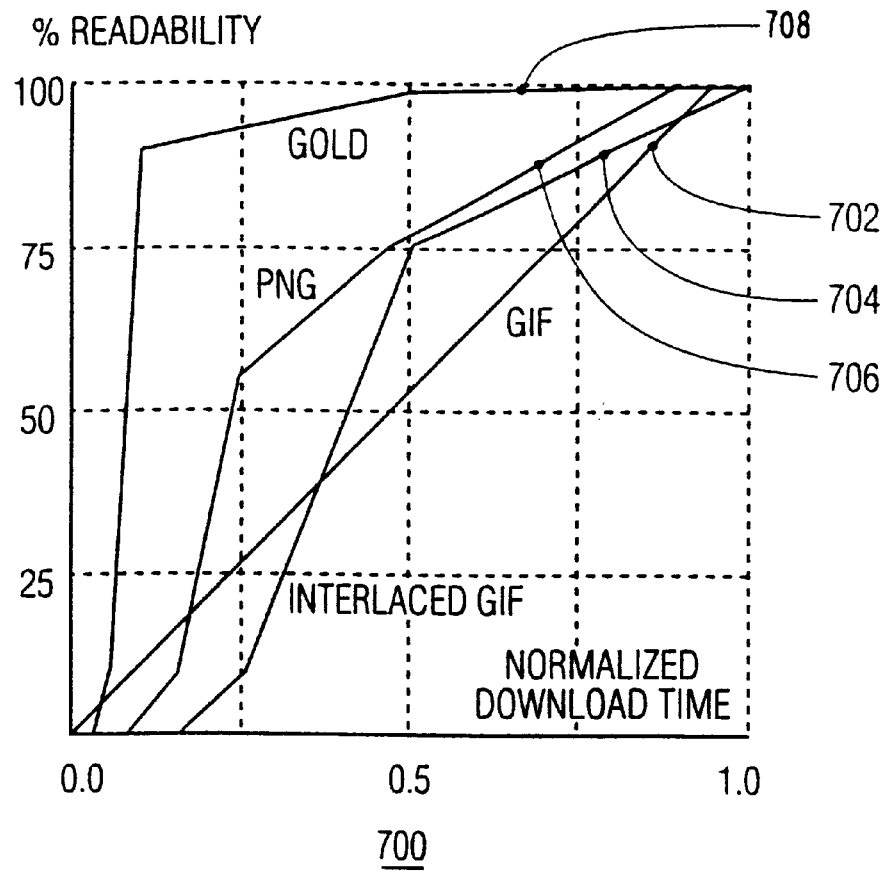
FIG. 7 is a diagram comparing readability as a function of time for various graphics formats during downloading.

Above example uses an encoding scheme with 1 bit per pixel in overlay 500, or 8 pixels per byte. This encoding can be achieved by comparison to a single threshold and overlay 500 is a binary overlay. Overlay 500 then results in transparency where the pixel value is, say, unity and black where the pixel value is zero. Alternative encoding schemes can be used. For example, 2 thresholds can be used in order to discriminate between three intensity levels for creating a trinary overlay that accommodates 5 pixels per byte, or 3 thresholds for discrimination between four intensity levels in a quadruple overlay with 4 pixels per byte. Comparison Various Formats FIG. 7 is a diagram 700 comparing the readability of a transmitted image as a function of time for different formats. Diagram 700 is based on actual tests. It is assumed below that the readability level of 75% is adequate for the user to interpret the image.

A 100 KByte GIF (Graphics Interchange Format) requires at least 30 seconds to download via a 28.8 K modem. Readability increases proportionally to time, as indicated by line 702. An interlaced GIF allows the viewer to see enough of the image to navigate in it in about half the time required by non-interlaced GIF as indicated by line 704. Using the PNG format (Portable Network Graphics) legibility occurs even sooner than with interlaced GIF. This is due to the two-dimensional interlacing in PNG, whereas interlaced GIF uses a one-dimensional scheme. The progress of the PNG readability with time is the line indicated by reference numeral 706.

The readability as a function of time according to the method in the invention is given by the line indicated by reference numeral 708. Clearly, readability is achieved in a considerably shorter time than is possible with any of the other formats discussed.

Image Processing System

Figure 8:
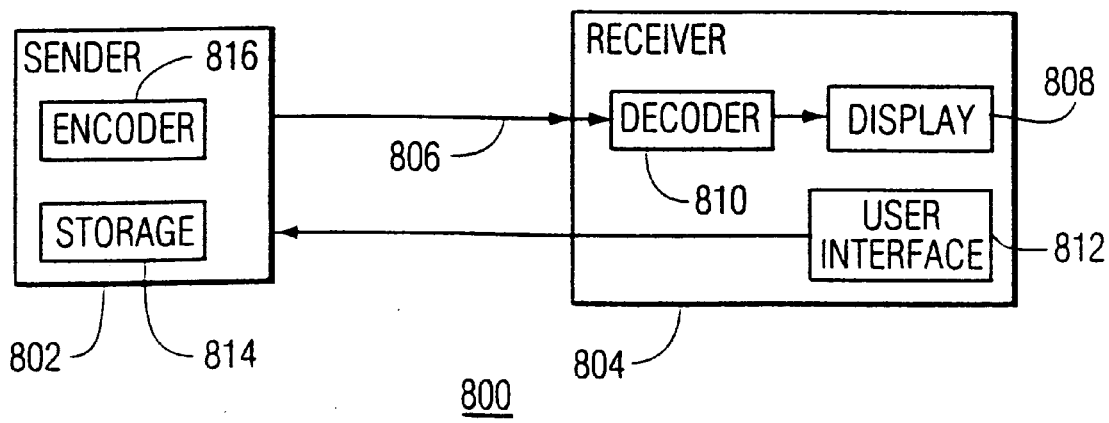
FIG. 8 is a diagram of an image processing system of the invention.

FIG. 8 is a diagram of an image processing system 800 of the invention. System 800 comprises a sender 802 and a receiver 804, interconnected via a coupling 806. Sender 802 may be a remote device, e.g., a server interconnected via a long-distance interconnection network, or a local storage device such as a CD-I functionally integrated with receiver 804. Receiver 804 has a display 808 or another memory device. Sender 802 transfers an image to receiver 804 via coupling 806. Operation of system 800 is as follows.

First, sender 802 transmits a low-resolution full-color representation of the image to receiver 804. This representation typically relates to a background of the image. The low-resolution representation is, for example, a version of the original image reduced by a factor of, say, 16 in size, requiring 2–3% of the byte size of the original image. Receiver 804 has a decoder 810 for restoring this low-resolution representation to the full-size using, e.g., an N-tap filter, with N typically being larger than 3. The result may be quantized to the original's limited color map, if any. Decoder 810 may apply dithering methods to the restored background in order to improve the background's appearance on display 808. The feasibility of this option depends on the compute power of the CPU of decoder 810. The restored, and possibly improved, low-resolution representation is stored at display 808.

Thereupon, sender 802 transfers a spatially high-resolution representation of the original image but in limited pixel depth. As mentioned above, the pixels of this high-resolution representation serve as control information to merge typically text characters, or typographical characters, such as an arrow or a box with the low resolution background. Both kinds of characters provide information that enables the user to determine the image's content for the purpose of, e.g., navigating though the web pages, e.g., via a user interface 812. The high-resolution representation is presented as an overlay and is combined with the background image at display 808 as discussed above.

Sender 802 may be operative to transfer a code to receiver 804 to implement a protocol handler and decoder for processing of the low-resolution representation and high-resolution representation at receiving end 804. Sender 802 may comprise a storage device 814 storing the differently formatted images to be sent to receiver 804. That is, storage device 814 stores a low-resolution full-color representation, a high-resolution limited color representation and an original high-resolution, full color image to be transmitted consecutively in order to enable creating an image as discussed above . Alternatively, or supplementarily, sender 802 may comprise an encoder 816 to encode an original full-resolution, full color image. The encoder operation is explained with reference to FIG. 9.

Encoder: Overlay Creation

Figure 9:
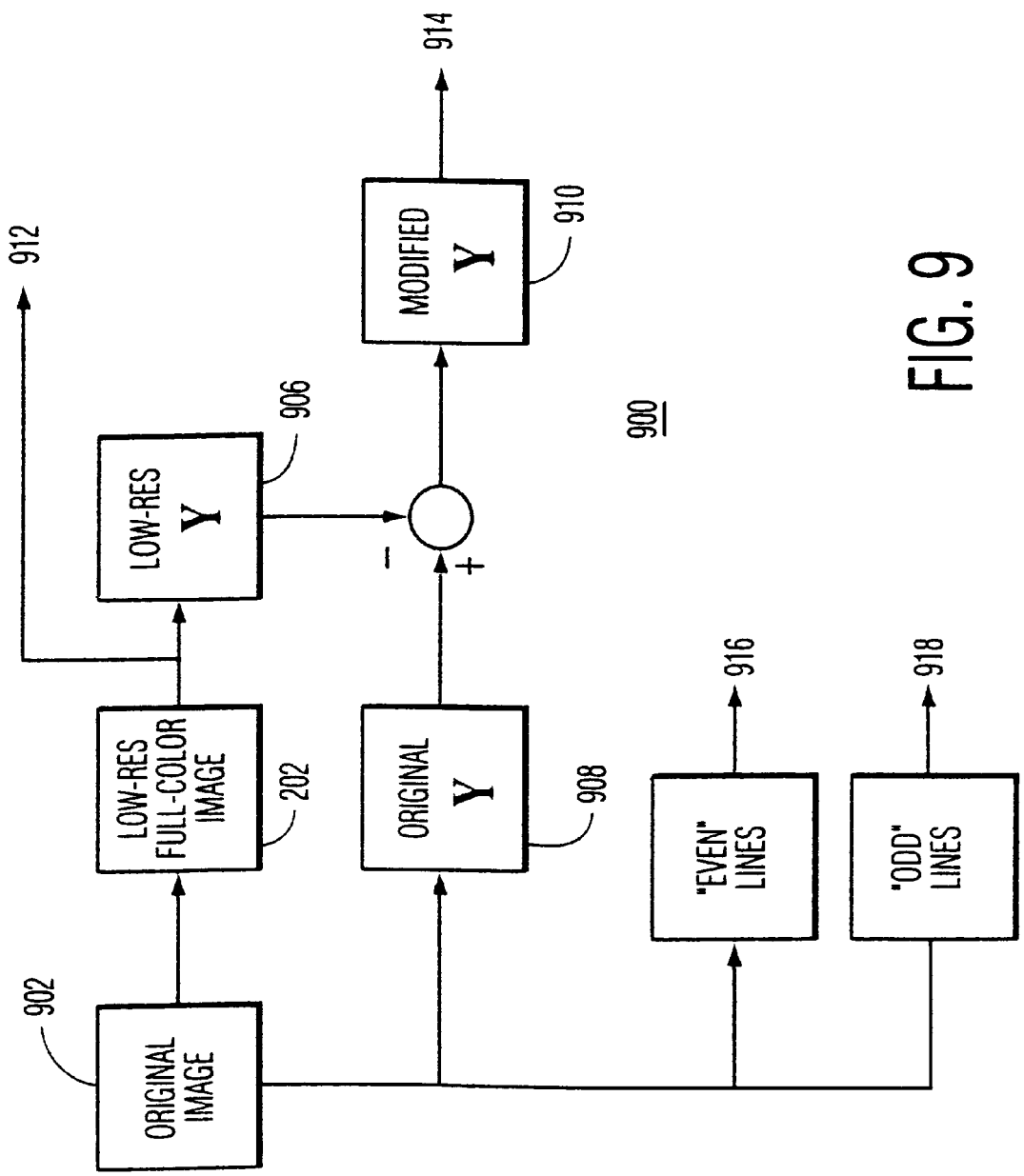
FIG. 9 explains the operation of an example of an encoder in the system of FIG. 8.

FIG. 9 is a diagram 900 of the operation of encoder 816 for creating the high-resolution, limited pixel-depth representation of an image using the "unsharp masking" technique known in astrophotography. Reference is also had to FIG. 2.

Encoder 816 receives an original image 902 and creates a spatially low-resolution fullcolor representation 202, preferably in a YUV format. Representation 202 is then mapped to a representation 906 only having intensity values, or Y-values, on a gray-scale, for example, 0–255. Encoder 816 further creates a grayscale image 908 of original image 902. Gray-scale image 908 is a representation of intensity levels or Y-values on the 0-255 gray-scale. Thereupon, image 906 is subtracted from image 908. The resulting modified representation 910 picks out the edges of objects and high-contrast features such as text characters. The results must be re-normalized since the pixel values of the difference may vary between −255 and +255. Re-normalization is effected by adding 255 to get a range 0–510 and by a subsequent divide-by-two operation (in binary representation a shift to the right). As an option, the re-normalized result is examined to determine what threshold (or multiple thresholds) is (are) best used to quantize the high-resolution, low-pixel-depth representation. Thresholds may be determined iteratively by testing the compression and using the result as feedback in order to adjust the threshold(s).

In operational use of the system, low-resolution, full-color image 202 is compressed and sent first as indicated by arrow 912. Then, modified result 910 is compressed and sent as indicated by an arrow 914. Optionally, original image 902 is sent subsequently, preferably as separate and compressed files for the even lines and for the odd lines of original image 902 as indicated by arrows 916 and 918.

Decoder

Figure 10:
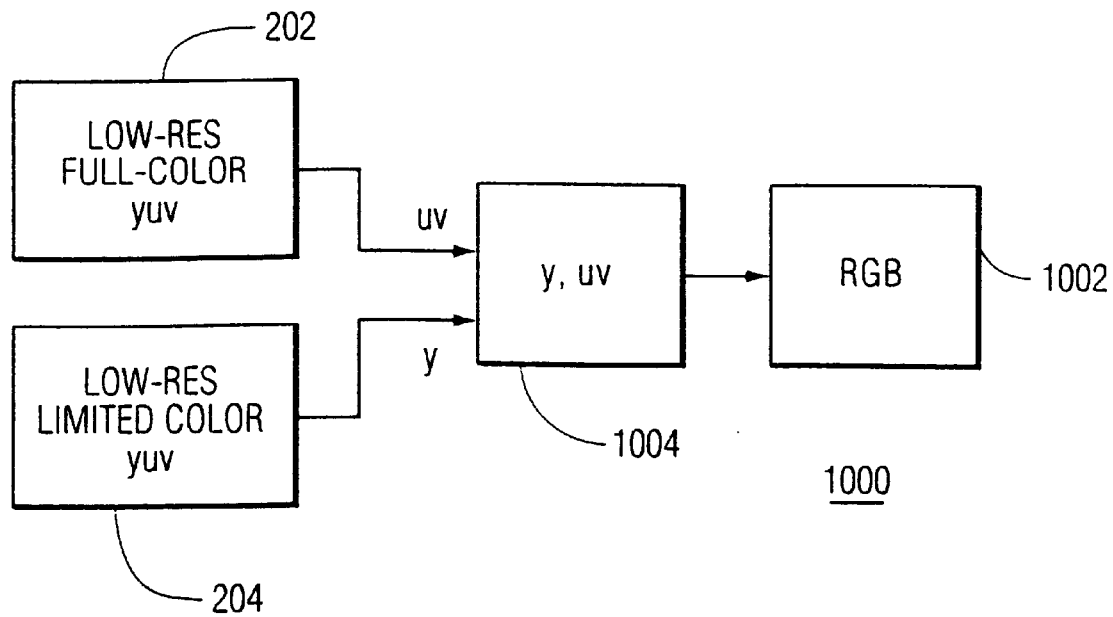
FIGS. 10 and 11 explain the operation of examples of a decoder in the system of FIG. 8.

FIG. 10 explains the operation a first embodiment 1000 of a decoder 810 in system 800, typically for use with 24-bit wide pixel values. Reference is had to FIGS. 2 and 9.

Decoder embodiment 1000 receives first representation 202 (low-resolution, full color) and second representation 204 (high-resolution, limited color) in a YUV-format, or in an RGB-format that is subsequently converted to YUV. A pixel of combined image 1002 is created by taking the Y-component of a corresponding pixel in second representation 204 and the UV-component of a corresponding pixel in first representation 202, giving intermediate result 1004, and converting this two-tuple into an RGB-format. This approach may require several floating-point calculations per pixel: the conversion YUV-RGB involves a matrix-vector multiplication, and a nearest-neighbor RGB-candidate must be calculated to map the result of the conversion to the content of the decoder's color-look-up table. Alternatively, integer-scaled arithmetic can be used. Above matrix-vector multiplication in the conversion involves multiplying the Y-, U- and V-components by pre-determined non-integer numbers. Using integer-scaled binary arithmetic provides an acceptable approximation in a fast way as follows. Instead of the pre-determined non-integer numbers, pre-determined scaled-up integers are used derived from the non-integers in binary representation by a shift to the left, possibly truncated. The sum-of-products in the matrix multiplication is then carried out with these scaled-up integers. The result of the sum-of-products is scaled down again by the same factor using a shift to the right in binary representation. Shifting is a much cheaper than a multiplication or a division and the conversion could be entirely implemented in simple hardware.

Figure 11:
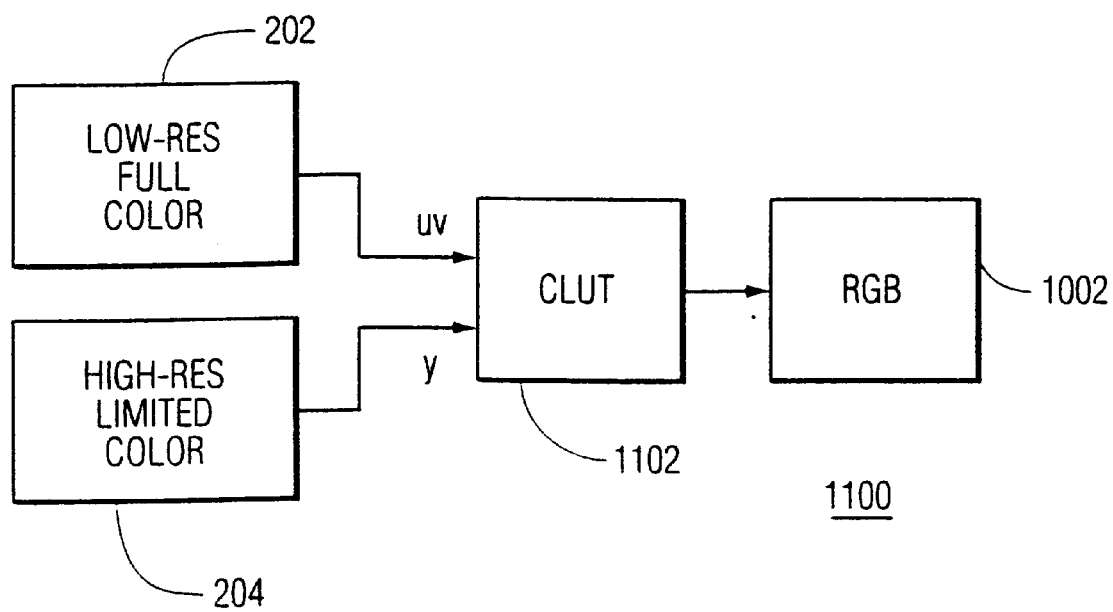

FIG. 11 explains the operation of a second embodiment 1100 of a decoder 810 is system 1000, typically for use with 8-bit wide pixel values. Reference is also had to FIGS. 2 and 9.

Embodiment 1100 uses the UV-component of a pixel in low-resolution representation 202 as a first index, and the limited number of possible Y-values for the Y-component in high-resolution representation 204 as a second index to access a predetermined color-look-up table 1102 for direct conversion into combined image 1002 in RGB-format. This avoids the time-consuming floating-point calculations mentioned above, but is feasible only if the number of values to be stored is conveniently small, e.g., 256 values for UV and 2 or 3 for Y. Of course, when the image is to be displayed in the YUV-format the RGB-conversion is left out.

We claim:

1. A method of enabling to create an image, the method comprising:

supplying a first image representation having a spatially low resolution and comprising first pixels, each with a first pixel value of a first pixel depth;

supplying a second image representation having a spatially high resolution and comprising second pixels, each with a second pixel value of a second pixel depth substantially smaller than the first pixel depth; and combining the first and second representations, the combining comprising:

assigning a further pixel value to a specific first pixel, spatially corresponding with a specific second pixel, under control of a specific second pixel value of the specific second pixel.

2. The method of claim 1, further comprising:

supplying a third representation of the image, the third representation having a spatially high resolution and having pixels with third pixel values of a third pixel depth greater than the second pixel depth; and overwriting the combined representations by the third representation.

3. The method of claim 1, wherein the assigning of the further pixel value is executed if the second pixel value complies with a threshold criterion.

4. The method of claim 3, wherein the assigning comprises:

selecting the further pixel value from a gray-value range.

5. The method of claim 3, wherein the assigning comprises:

creating the further pixel value with an intensity determined by the second pixel value and with a color content determined by the first pixel value.

6. The method of claim 1, comprising making the second image representation before the supplying thereof, the making comprising creating the second pixel values involving the following steps:

determining of an original intensity of each particular original pixel of an original image; and determining of a particular second pixel value of a particular one of the second pixels, spatially corresponding to the particular original pixel, as a function of the original intensity.

7. The method of claim 6, wherein the determining of the particular second pixel value involves comparing the original intensity to at least one predetermined threshold.

8. The method of claim 6, wherein the determining of the second pixel value involves:

determining a first intensity of each particular first pixel;

subtracting the first intensity of the particular first pixel from the original intensity of the particular original pixel, spatially corresponding to the particular first pixel;

re-normalizing a result of the subtracting; and using the re-normalized result to determine the particular second pixel value.

9. The method of claim 8, wherein the determining of the particular second pixel value comprises comparing the re-normalized result to at least one pre-determined threshold.

10. An image processing system for creating an image, the system comprising:

an input;

a memory connected to the input for receiving a first image representation having a spatially low resolution and comprising first pixels, each with a first pixel value of a first pixel depth;

a decoder coupled to the input and to the memory for receiving a second image representation having a spatially high resolution and comprising second pixels, each with a second pixel value of a second pixel depth substantially smaller than the first pixel depth, and for combining the first and second representations by assigning a further pixel value to a specific first pixel, spatially corresponding with a specific second pixel, under control of a specific second pixel value of the specific second pixel.

11. A decoder for use in the system of claim 10.

12. An image processing system comprising:

an input for receiving an input image;

an encoder connected to the input for creating a first image representation of the input image, the first image representation having a spatially low resolution and comprising first pixels, each with a first pixel value of a first pixel depth, and for creating a second image representation of the input image, the second image representation having a spatially high resolution and comprising second pixels, each with a second pixel value of a second pixel depth substantially smaller than the first pixel depth; and an output for supplying the first and second image representations.

13. A computer-readable storage device comprising:

a first image representation of an image, the first image representation having a spatially low resolution and comprising first pixels, each with a first pixel value of a first pixel depth;

a second image representation of the image, the second image representation having a spatially high resolution and comprising second pixels, each with a second pixel value of a second pixel depth substantially smaller than the first pixel depth.

* * * * *